Figure 1:
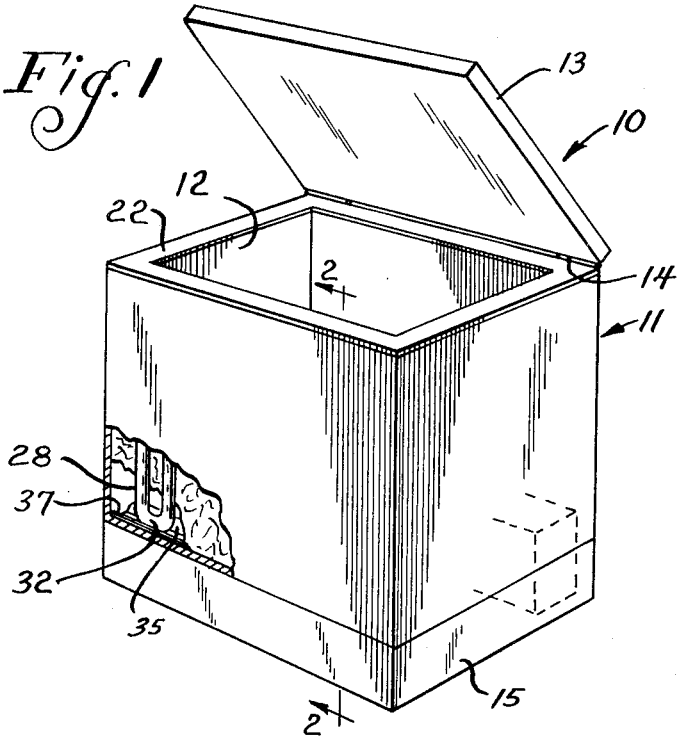
Figure 2:
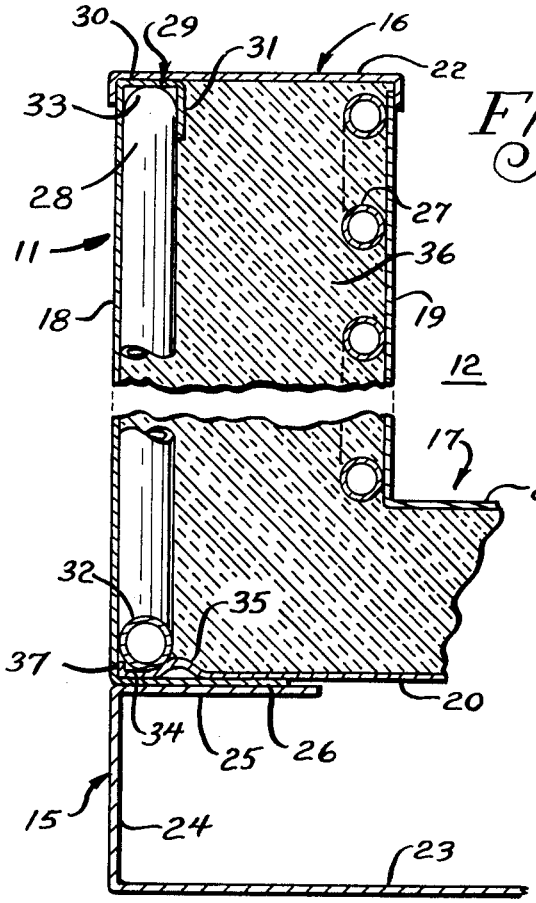

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED APRIL 6, 1976

945 O.G. 31

T945,009

FREEZER CABINET CONSTRUCTION

George J. Fleck, White Bear Lake, Robert H. Sitko, Stillwater, and Donald G. Seiberlich, St. Paul, Minn., assignors to Whirlpool Corporation

Filed Feb. 24, 1975, Ser. No. 552,547
Int. Cl. A47b *77/08;* A47f *3/04*
U.S. Cl. 312—236
1 Sheet Drawing. 2 Pages Specification

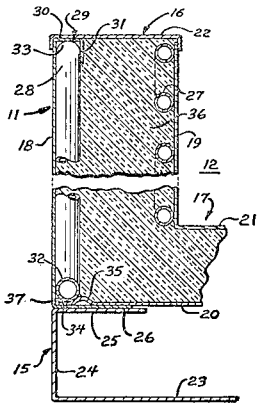

A freezer cabinet construction and method of forming the same wherein a serpentine heat exchanger is associated with portions of the walls of the cabinet in such a manner as to retain the wall portions in assembled relationship. The improved cabinet construction eliminates the use of welding and a mechanical fastening and permits the use of prepainted wall panels. Insulation may be placed in the wall construction, further retaining the heat exchanger unit in the desired association with the wall portions.

FREEZER CABINET CONSTRUCTION

Original Filed Feb. 24, 1975